J. RUSHWORTH.
Friction-Drums for Hoisting-Machines.

No. 200,345. Patented Feb. 12, 1878.

Witnesses.
Otto Hufeland
Chas. Wahlers.

Inventor.
John Rushworth
by
Van Santvoord & Hauff
his attorneys

UNITED STATES PATENT OFFICE.

JOHN RUSHWORTH, OF NEW YORK, N. Y.

IMPROVEMENT IN FRICTION-DRUMS FOR HOISTING-MACHINES.

Specification forming part of Letters Patent No. 200,345, dated February 12, 1878; application filed August 15, 1877.

*To all whom it may concern:*

Be it known that I, JOHN RUSHWORTH, of the city, county, and State of New York, have invented a new and useful Improvement in Hoisting-Machines, which improvement is fully set forth in the following specification, reference being had to the accompanying drawing, in which—

Figure 1:
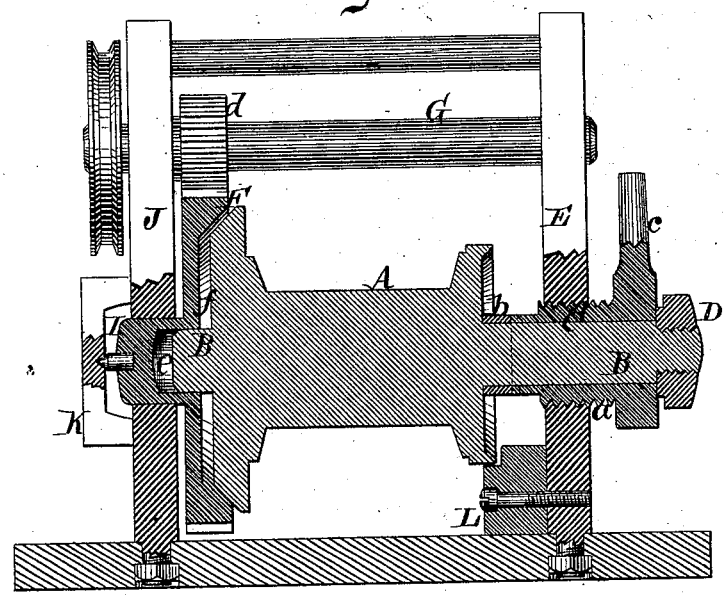
Figure 2:
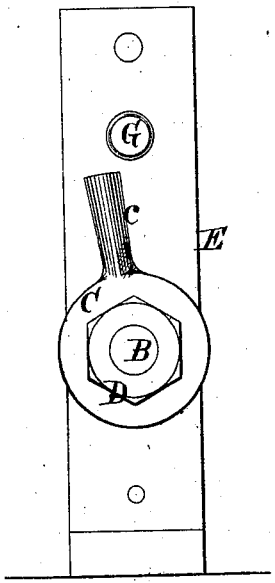

Figure 1 represents a vertical central section of a machine containing my improvement. Fig. 2 is an end view thereof.

Similar letters indicate corresponding parts.

My invention consists in the combination, in a hoisting-machine, of a collar having an external screw-thread and fitted loosely on the shaft of the hoisting-drum, the latter being fast to the shaft, with a standard having a threaded hole for the reception of said collar, a nut secured to the end of said shaft, and a friction wheel or pulley the axis of which coincides with the axis of the hoisting-drum, in such a manner that when the screw-collar is turned in one direction it exerts a pressure on the hoisting-drum and throws the same in contact with the friction wheel or pulley, so that, if a revolving motion is imparted to the latter, the hoisting-drum partakes of such motion, while, when the screw-collar is turned in the other direction, it presses or bears on the nut secured to the end of the drum-shaft, by which means the drum is brought out of contact with the friction wheel or pulley, and I am enabled to reverse the motion of the drum, as in lowering, without reversing the motion of the friction wheel or pulley.

It also consists in the combination, with a screw-collar, standard, drum-shaft, and nut, operating as specified, of a friction wheel or pulley having a gudgeon which passes through a standard of the machine-frame, and is stepped in a block secured to said standard, whereby a bearing is obtained for the friction wheel or pulley, which is to the greatest possible extent anti-frictional.

It consists, also, in the combination, with a screw-collar, standard, drum-shaft, nut, and a friction wheel or pulley of suitable form, operating as specified, of a brake-block so arranged that when the hoisting-drum is withdrawn from contact with the friction wheel or pulley it can be brought in contact with such block, and by this means the motion of the drum can be arrested, as hereinafter more fully set forth.

In the drawing, the letter A designates the drum of my machine, having the usual form, and which is preferably shaped in one piece with its shaft, as seen in Fig. 1.

On the shaft B is fitted and placed loosely a collar, C, which is provided with an external screw-thread, a, for part or the whole of its length, and so arranged as to bear on the drum A at one end, a washer, b, being interposed between the same and the drum, while at its other end it bears on a nut, D, secured to the end of the shaft B.

The collar C works in a threaded hole formed in a standard, E, and it is, by preference, provided with a handle, c, for turning the same.

The letter F designates a wheel which, in the example shown, is provided with cogs, and gears with a pinion, d, mounted on a driving-shaft, G, but which may be made in form of a pulley. This wheel F is mounted in such a way that its axis coincides with the axis of the hoisting-drum A, and it is arranged contiguous to one end of the drum, while it has a conical recess, f, to receive the end of the drum.

One end of the drum-shaft A has its bearing in the screw-collar C, while its other end is inserted in a cavity, e, formed in the wheel F, this cavity being made of such length as to permit of a slight longitudinal movement of the shaft.

When the screw-collar C is turned in one direction, it forces the hoisting-drum A toward the wheel F, and holds the same in frictional contact therewith, so that the drum partakes of the motion of said wheel, while, when the collar is turned in the other direction, it draws the drum away from the wheel F by its pressure on the nut D, when the drum can be turned in a reverse direction to the wheel F, for the purpose of lowering, or for any other purpose, without interfering with the motion of the wheel F.

The wheel F is provided with a gudgeon, I, which is passed through a suitable hole formed in a standard, J, corresponding to the standard E, while the end of such gudgeon is stepped in a block, K, secured to the standard J.

It will be seen that by this arrangement the friction resulting from the pressure of the hoisting-drum A endwise on the wheel F is reduced to a minimum, and loss of power from this cause is obviated.

To the standard E is secured a block, L, which is intended to form a brake for stopping the hoisting-drum A, this block being placed in such a position that by simply drawing the drum toward it a sufficient distance by means of the screw-collar C the drum is brought in contact with the block, and effectually prevented from turning.

What I claim as new, and desire to secure by Letters Patent, is—

1. In a hoisting-machine, the combination of a collar having an external screw-thread and fitted loosely on the shaft of the hoisting-drum, with a standard having a threaded hole for the reception of said collar, a nut secured to the end of said shaft, and a friction wheel or pulley the axis of which coincides with the axis of the hoisting-drum, the whole being adapted to operate substantially as described.

2. In a hoisting-machine, a friction wheel or pulley having a gudgeon which passes through a standard of the machine-frame, and is stepped in a block secured to said standard, in combination with a collar having an external screw-thread and fitted loosely on the shaft of the hoisting-drum, a standard having a threaded hole for the reception of said collar, and a nut secured to the end of said shaft, the whole being adapted to operate substantially as described.

3. In a hoisting-machine, the combination of a brake-block adapted to arrest the motion of the hoisting-drum, with a collar having an external screw-thread and fitted loosely on the shaft of the hoisting-drum, a standard having a threaded hole for the reception of said collar, a nut secured to the end of said shaft, and a friction wheel or pulley the axis of which coincides with the axis of the hoisting-drum, the whole being adapted to operate substantially as described.

In testimony that I claim the foregoing I have hereunto set my hand and seal this 6th day of August, 1877.

JOHN RUSHWORTH. [L. S.]

Witnesses:
W. HAUFF,
CHAS. WAHLERS.